United States Patent [19]

Hahn

[11] 4,132,825
[45] Jan. 2, 1979

[54] COMPOSITE STRUCTURAL MEMBER, ESPECIALLY FOR DYNAMIC LOADS

[75] Inventor: Hans-Jürgen Hahn, Hamburg, Fed. Rep. of Germany

[73] Assignee: Messerschmitt-Bölkow-Blohm GmbH, Munich, Fed. Rep. of Germany

[21] Appl. No.: 690,025

[22] Filed: May 26, 1976

[30] Foreign Application Priority Data

May 30, 1975 [DE] Fed. Rep. of Germany ....... 2524011

[51] Int. Cl.² .................. B32B 5/18; B32B 27/40; B32B 15/08
[52] U.S. Cl. ................. 428/311; 428/315; 428/424; 428/457
[58] Field of Search ............. 248/22, 358 R; 428/160, 428/315, 424, 311, 457

[56] References Cited

U.S. PATENT DOCUMENTS

| | | | |
|---|---|---|---|
| 2,622,836 | 12/1952 | Lee | 248/22 X |
| 3,160,549 | 12/1964 | Caldwell et al. | 248/358 R |
| 3,496,058 | 2/1970 | Schroter et al. | 428/160 |
| 3,542,638 | 11/1970 | Kenny | 428/311 X |
| 3,567,568 | 3/1971 | Windecker | 428/311 X |
| 3,816,233 | 6/1974 | Powers | 428/315 X |
| 3,844,876 | 10/1974 | Wilson et al. | 428/315 X |

FOREIGN PATENT DOCUMENTS

| | | | |
|---|---|---|---|
| 931114 | 7/1963 | United Kingdom | 428/311 |
| 1214748 | 12/1970 | United Kingdom | 428/424 |

*Primary Examiner*—Marion E. McCamish
*Assistant Examiner*—Alexander S. Thomas
*Attorney, Agent, or Firm*—W. G. Fasse; W. W. Roberts

[57] ABSTRACT

A composite structural member is constructed to take up dynamic loads. A force transmitting element is glued to a force applying element and to a force take-up element to form the composite member. The force transmitting element is a molded blank of cellular polyurethane having an open cell structure throughout. The open cells also extend along the surfaces glued to the force applying element and to the force take-up element. The glue or adhesive used is a moisture curing polyurethane prepolymer capable of penetrating into said open cell structure, thereby greatly increasing the adhesive bond.

12 Claims, 4 Drawing Figures

U.S. Patent
Jan. 2, 1979
4,132,825
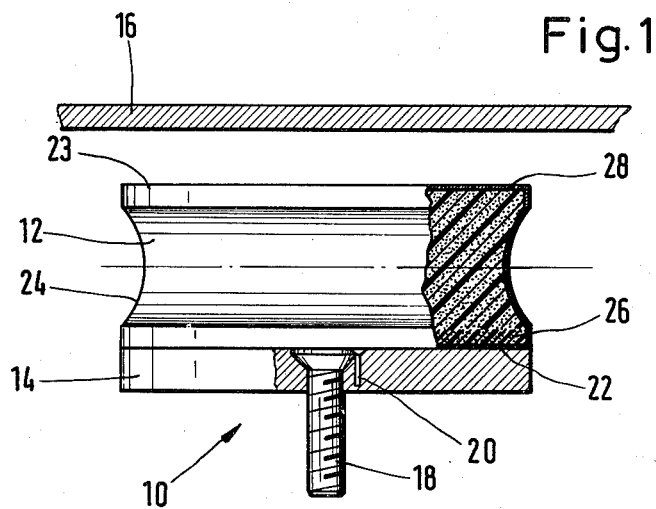
Fig.1
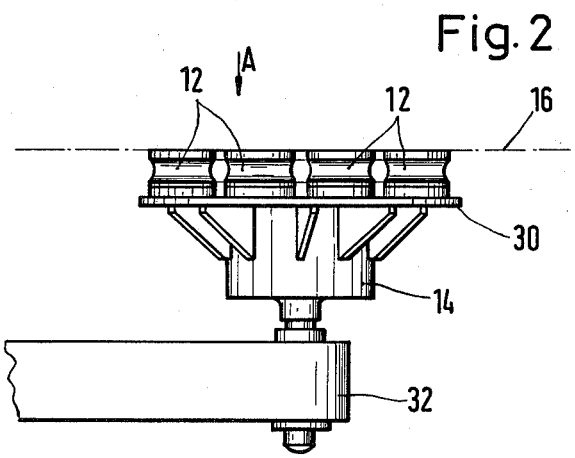
Fig.2
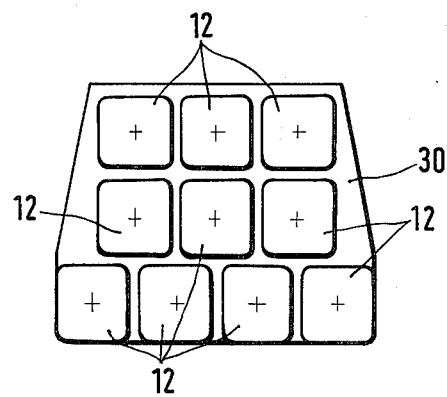
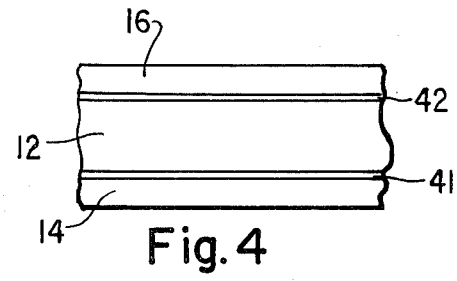
Fig.3
Fig.4

COMPOSITE STRUCTURAL MEMBER, ESPECIALLY FOR DYNAMIC LOADS

BACKGROUND OF THE INVENTION

The present invention relates to a composite structural member, especially constructed for taking up dynamic loads. The load applying element is connected to the load take-up element through force transmitting means of elastic material glued to said elements along the surface thereof. The force transmitting means may comprise one elastic material element or a plurality of such elements arranged in groups. Composite structural members of this type are especially used in connection with testing the sheet metal forming the skin of the body of an aircraft or the like, whereby such sheet metal skin constitutes the force take-up element and the force applying element is connected to a source of power generating the dynamic testing force, whereby the just described structure forms a fatigue or limit testing cell for such aircrafts or the like.

It is known to construct composite structural elements by employing various gluing techniques. Thus, it is known to glue without any pressure the load applying hardware and the load take-up plate to a rubber block by means of a reaction glue free of any solvent. For example, modified epoxy resins or so called polyurethane precursors in the form of a two component adhesive are suitable for this purpose. However, the fatigue or breaking strength of these glued connections is frequently inadequate, for example, where such component structural members are used in connection with fatigue testing cells in aircrafts or the like. For this purpose, it is necessary to connect the rubber block to the sheet metal forming the skin of the aircraft without using stiffening means for the skin sheet metal, which would falsify the measured results. Moreover, the glued connection is frequently exposed to very large dynamic loads within unfavorable frequency ranges, especially where longivity tests are performed. This is so, even if several load transmitting elements, such as said rubber blocks are arranged in groups in order to distribute the load application over a larger surface. The number of rubber blocks would, of course, be selected with due regard to the load to be transmitted.

It is also known to secure the load transmitting element to the two other elements by means of a reaction molding method, which employs a cold curing, viscous flowing mass of a polyurethane prepolymer. This mass is directly cast onto the skin sheet metal, whereby the mass enters into an intimate bond with the sheet metal, as well as with the load applying hardware or element. The adhesion between such polyurethane elastomers and the light metal surface reaches rather high values. However, the load strength of such composite structures is also rather limited, because breaks or fractures in the cohesion have been encountered where large dynamic loads or increasing tension loads are applied to these structures. Furthermore, such castable masses have a limited shelf life. Besides, these masses tend to form shrinkage cavities due to side reactions so that these known composite structures are mostly used where relatively small tension loads are expected to be encountered.

It is also known that molded blanks of polyurethane having an open cell porous structure which are produced by pressure casting or molding and simultaneous heat application, have a high tensile strength and a large breaking elongation. In addition, these molded blanks have a substantial resistance against tearing, especially against the transmitting of a tearing throughout the blank. Their resistance against oxygen, ozone, oil and fuel such as gasoline is also well known. In addition, these molded blanks have a fatigue or breaking strength as well as a normal strength and permanent deformation characteristics similar to those of rubber type materials. Besides, the relatively high hardness combined with a simultaneous large elasticity is unmatched by any other elastomeric materials. In view of these advantageous material characteristics of open cell polyurethane molded blanks, this type of material is well suited for avoiding a cohesion failure, even in connection with so called longivity load tests, such as are performed, for example, in connection with aircraft failure test cells which are exposed to a number of load changes exceeding $10^7$, whereby these materials still avoid failures. However, so called adhesion failures between the load input element and the load transmitting element, as well as between the latter and the load take-up element are not uncommon due to the limited adhesion strength and the limited resistance against peeling of the glued connection.

OBJECTS OF THE INVENTION

In view of the above, it is the aim of the invention to achieve the following objects, singly or in combination:

to construct a composite structural member by means of adhesives which avoids the drawbacks of the prior art, which may be manufactured in an economic manner, and which is capable of transmitting high, sustained loads in a manner free of failures, whereby such loads may be dynamic loads or increasing tension loads;

to provide the molded blank which is the load transmitting member with an open cell structure, especially along its surfaces, which are to be connected by adhesion to the other elements of the composite structure, whereby the adhesive or glue may penetrate into the cellular structure to assure a three dimensional mechanical anchoring;

to provide a composite structural member capable of transmitting dynamic loads several times larger than comparable prior art structures;

to substantially increase the fatigue or limit strength of such composite structural members, manufactured by means of adhesion; and to employ such a combination of materials including an adhesion enhancing surface coating that a simultaneous curing of the adhesive, of the intermediate element, and of the surface coating may be achieved.

SUMMARY OF THE INVENTION

According to the invention there is provided a composite structural member, wherein the force transmitting element between force applying means and force take-up means is a blank of open cell polyurethane, the open cells of which extend throughout the force transmitting element and especially along the adhesion surfaces, which are glued to the adjacent elements by a moisture curing polyurethane polymer adhesive.

The force transmitting intermediate element is produced by pressure molding or casting under application of heat, whereby blanks are formed having a high hardness and simultaneously a high elasticity, which is then combined with an optimal adhesive bond of high strength resulting from the moisture curing or hardening polyurethane precursor or prepolymer. The especially strong and intimate adhesive bond is achieved because the blank has an open cell structure, even along the adhesion surfaces, since according to the invention the so called pressing or molding skin is avoided or removed. This has the advantage that the adhesive penetrates for several millimeters into the cellular material of the blank, so that a mechanical anchoring is achieved which simultaneously reduces the shearing and peeling forces, which tend to be present in prior art structures. Another advantage of this type of anchoring by adhesion is seen in that the critical zone of the maximum extension resulting from increasing tension loads is removed away from the interface between the two members into the body or core of the cellular polyurethane blank. Another advantage of the invention is seen in that the module of elasticity and the strength of the layer of adhesion are substantially increased by the respective selection of the adhesive in the form of a moisture curing polyurethane prepolymer. As a result, the composite structural element according to the invention has a dynamic load strength several times higher than that of prior art structures.

BRIEF FIGURE DESCRIPTION

In order that the invention may be clearly understood, it will now be described, by way of example, with reference to the accompanying drawings, wherein:

FIG. 1 illustrates a side view, partially in section, of a composite structural member according to the invention with the force take-up element in a position just prior to the gluing step and with the force applying element already glued to the force transmitting element;

FIG. 2 shows a structure comprising several force transmitting elements arranged in groups;

FIG. 3 illustrates a top view onto the embodiment of FIG. 2 as viewed in the direction of the arrow A; and FIG. 4 is a simplified illustration of the structure of the invention.

DETAILED DESCRIPTION OF PREFERRED EXAMPLE EMBODIMENTS

FIG. 1 shows a composite structural element 10 comprising an intermediate or elastic force transmitting element 12 formed as a blank of cellular polyurethane having an open cell structural throughout its volume and especially along its surfaces 22 and 23. The intermediate element 12 is produced by pressure casting or molding methods while heat is applied to the material. Thus, initially the element 12 is surrounded by the conventional so called pressing skin 28. According to the invention, this pressing skin is removed just prior to the gluing operation along surfaces 22 and 23 which form adhesion surfaces. The removal may, for example, be accomplished by mechanical means. The force transmitting element 12 is, for example, provided with a concave groove 24 running around the entire circumference of the element 12. The skin 28 need not be removed along the circumferential surface or groove 24.

A load applying element 14, such as a steel plate, is glued to the adhesion surface 22, as will be described in more detail below. The loads, such as dynamic testing loads, are applied to the structural member through a screw bolt 18, which is screwed into the plate 14 and secured by a pin 20.

According to the invention, the adhesion is accomplished by a moisture curing polyurethane single component reaction adhesive having a thixotropic consistency. As mentioned, the so called pressing skin 28 is removed from the adhesion surface 22 of the blank 12, for example, by standing or the like. Thereafter, the adhesive is applied to the open cell adhesion surface 22 so that it penetrates for several millimeters into the body of the blank 12 (as indicated by by reference numeral 26). This penetration 26 of the adhesive into the open cellular structure of the element 12 is shown in FIG. 1. If desired, a temperature curing or after-curing of the adhesive bond may also be employed.

A load take-up element 16, such as the sheet metal of an aircraft body is glued to the surface 23 in the same manner as described above with regard to the load applying element 14, whereby, for example, a dynamic aircraft fatigue testing cell is obtained. Again the pressing skin 28 is removed just prior to the application of the adhesive. In order to achieve an especially strong adhesive bond, it is recommended to apply a relatively flowable coat on the surface of the load take-up element 16 which may be a plate of light metal, such as aluminum. Such coat would also be a moisture curing polyurethane prepolymer 33 having a thixotropic consistency including free isocyanate groups. Such coat would preferably be applied subsequent to preparing the surface of the element 16 for the gluing by cleaning such surface, as is well known in the art. The alignment, pressure application and fixation of the blank 12 relative to the element 16 is performed prior to the completion of the curing reaction of the adhesion improving coat on the element 16 and of a thixotropic adhesive to the element 12.

FIGS. 2 and 3 show an arrangement of several blanks 12 placed in groups, whereby the number of blanks in a group is selected with due regard to the load to be transmitted. Each blank 12 in FIGS. 2 and 3 is glued to the load applying element and to the load take-up element in the same manner as described above. However, an intermediate plate 30 is secured to the load applying element 14 and dynamic loads are applied to the structure by a cross arm 32. The load take-up element 16 is shown by a dash-dotted line. In other words, the element 16 is removed in order to illustrate the position of the blanks in FIG. 3. The element 16 would be glued to the blanks as described above.

It has been found that a composite structural member as described herein and employing a blank or element 12 having a specific density of 400 to 600 kg per cubic meter is capable to transmit dynamic alternating loads or increasing tension loads up to 6 kg per square centimeter, whereby even after $10^7$ load alternations, no failure could be observed in the composite member.

Incidentally, the concave groove 24 running around the circumference of the blanks 12 between the adhesion surfaces 22, 23 permits an adjustment or variation of the elasticity and the hardness of the blanks 12 in the direction of force transmission. In addition, the groove 24 helps removing the plane of maximum stretching from the plane of the adhesive bonding.

In view of the foregoing description, it will be appreciated that the method according to the invention involves the following steps: formation of the blanks 12 by a pressure casting or molding method employing cellular polyurethane prepolymers capable of moisture curing, removing the pressing skin along the adhesion surfaces 22, 23, applying the adhesive to these surfaces, applying simultaneously an adhesion improving coating on the surfaces of the elements 14 and 16, and contacting the so prepared elements with each other preferably under pressure. These simple steps result in a very strong bond between the elements of the composite member, while simultaneously substantially reducing the costs of production. Preferably, the present method employs an adhesive having a thixotropic consistency in order to thoroughly drench the body of the blanks adjacent to the adhesion surfaces 22, 23 to a depth of at least several millimeters, such as 5 millimeters or more.

Thus, the structure of the invention, as more simply illustrated in FIG. 4, comprises one or more blanks of polyurethane having open cells sandwiched between the load applying element 14 and the load take-up element 16. The blank 12 is glued to the elements 14 and 16 by the adhesive layers 41 and 42, therebetween. As discussed above, the adhesive layers 41 and 42 penetrate into the surface of the blank 12, as shown at 26 in FIG. 1. The layers 41 and 42 comprise a moisture curing polyurethane single component reaction adhesive having a thixotropic consistency as mentioned above.

Although the above enumerated steps of the present method includes the step of coating the surfaces of the elements 14 and 16 with an adhesion improving coat, it will be appreciated that such coating is not absolutely necessary for practicing the invention. However, if such coating is employed, it is advantageous to use a relatively thin flowing moisture curing polyurethane prepolymer having free isocyanate groups, whereby the two surfaces are contacted prior to the curing of the coating on the elements 14 and 16, whereby it is assured that the adhesive and the adhesion improving coating can cure simultaneously. The curing takes place by a reaction of the isocyanate groups with the humidity of the surrounding atmosphere, whereby the curing is facilitated by the open cell structure, which permits free access of the humidity to the adhesion surface. The reaction between the oxide hydrate film on the light metal surface, for example, of element 16 and the strongly polar isocyanate groups of the coating on the surface of element 16 results in main valence bonds. The same bonds result from the reaction between the adhesion improving coating and the adhesive layer in the open cells of the blank 12, as well as between said layer and the cellular material of said elastic blank, whereby a combination of a good mechanical anchoring and a chemically caused adhesion combine in exceptionally strong bonds between the elements of the composite member.

The curing and the polymerization of the single component glue can be substantially accelerated by storing the composite member in a moist atmosphere having a humidity of 90 to 100% and a temperature of about 20° to 30° C. Such storing could, for example, be continued for up to 12 hours. In this context, the cellular structure of the polyurethane of the blank 12 may take up two to three percent of water by weight of the blank. This water reacts directly with the moisture curing adhesive. By such a storing in a humid environment dependency on the humidity of the atmosphere is eliminated, whereby a more controlled curing is accomplished thereby providing a possibility of adapting the hardness and elasticity of the blank 12, as well as of the adhesive layers to particular requirements. A further possibility of adaptation is given by the selection and mutual correlation of the isocyanate and the components reacting with the isocyanate, namely, the high molecular hydroxyl groups of polyester or polyether. Such correlation is known as such for polyurethane synthetic material. In any event, by the simultaneous curing of the adhesive and the adhesive improving coating, a bond is accomplished which may be subjected to high loads. If desired, the curing may be accomplished by controlled application of heat, as is known as such.

In the present context, a polyurethane prepolymer is a reaction product obtained, for example, by the isocyanate poly-addition method employing polyisocyanates preferably diisocyanates in combination with higher molecular polyesters and polyethers including hydroxyl groups and in combination with synthetic caoutchouc. The reaction product comprises free NCO groups. These free NCO (isocyanate) groups enable the viscous, tacky prepolymer to perform further polymerization reactions. An example of such a prepolymer may have the following characteristics:

NCO content 8% by weight
Viscosity at 20° C. about 3,000 cp (centipoise)
Color number according to DIN 6162 about 6
Flame point according to DIN 51584 larger than 200° C.
Density at 20° C. 1.16 g/cm³

The isocyanate component is a diphenylmethane 4,4′-diisocyanate (MDI) having the following structure:

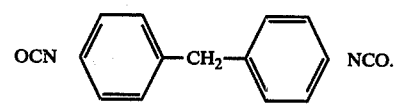

Prepolymers as described above are available on the market and are used by the lacquer and synthetic materials industry. One example is known under the tradename "Desmodur E 22" sold by Farbenfabriken Bayer AG. However, the invention is not limited to this example. The invention may be practiced with generally available two component adhesives free of a solvent and comprising free hydroxyl groups, which may be polymerized with isocyanates. When these free hydroxyl groups polymerize with isocyanates they form prepolymers having excess isocyante groups capable of reacting with moisture. Prepolymers of this type are, for instance, polybutadieneacrylonitrile, which is an interpolymer of butadiene and acrylonitrile. An example as used according to the invention would be as follows:

| | |
|---|---|
| polybutadieneacrylonitrile as a mastic (acrylnitrile content 28% by weight having a Mooney plasticity of ML-4' at 100° C about 95, a Defo-hardness at 80° C of about 1,800) | 100 (parts by weight) |
| solvent mixture ketones | 42 (parts by weight) |
| chlorinated rubber ("Pergut") | 3 (parts by weight) |
| zinc oxide (active) | 5 (parts by weight) |
| synthetic resin type AFS sold by Farben Fabriken Bayer Aa | 20 (parts by weight) |
| triphenylmethane 4,4′,4″ triisocyanate | 12 (parts by weight) |

The above mentioned thixotropic consistency of the prepolymer, such as "Desmodur E 22" may be accomplished, for example, by adding a suitable quantity of a highly disperse silicic acid.

An example for a suitable adhesion improving coating, for example, on the surface of the light sheet metal element 16 would be as follows:

| | |
|---|---|
| neoprene (polychloroprene) | 100 (parts by weight) |
| phenyl-β-naphthylamine | 2 (parts by weight) |
| zinc oxide | 4 (parts by weight) |
| magnesium oxide | 5 (parts by weight) |
| calcium silicate | 10 (parts by weight) |
| triphenylmethane-4,4',4''-triisocyanate | 20 (parts by weight) |
| methylenechloride | 80 (parts by weight) |
| methylisobutylketone | 110 (parts by weight) |

Although the invention has been described with reference to specific example embodiments, it is to be understood, that it is intended to cover all modifications and equivalents within the scope of the appended claims.

What is claimed is:

1. A dynamic load transmitting composite structural device comprising load introducing means (14, 18), a load take-up metal element (16) and an intermediate means (12), as well as adhesive bonds between said intermediate means and said load introducing means as well as between said intermediate means and said load take-up element, said adhesive bonds bonding said intermediate means to said load take-up element, and to said load introducing means, said intermediate means comprising at least one pressure cast polyurethane blank having open cells, said adhesive bonds comprising a slowly curing, moisture curable polyurethane prepolymer slowly cured in a humid atmosphere in intimate contact with said open cells, whereby the prepolymer penetrates into said open cells to form a mechanical anchoring as well as a chemical bond capable of taking-up repeatedly applied dynamic loads, said load introducing means comprising a load distribution metal plate (14) and a load applying member (18) rigidly secured to said load distribution metal plate bonded to said open cells of said blank, whereby the dynamic load is introduced substantially at a point and transmitted to said load take-up element substantially over a surface area.

2. The composite structural member according to claim 1, wherein said blank of open cell polyurethane has a specific density of 400 to 600 kg/m³.

3. The composite structural member according to claim 1, wherein said blank of open cell polyurethane comprises concave groove means running around its periphery.

4. The composite structural member according to claim 1, further comprising a bond enhancing coating on the surface of at least one of said first and second elements, said coating comprising a moisture curable polyurethane prepolymer including free isocyanate groups.

5. The composite structural member according to claim 4, wherein said coating has a relatively thin, liquid consistency.

6. The composite structural member according to claim 1, wherein said intermediate means comprises a plurality of open cell polyurethane blanks arranged in groups between said first and second elements.

7. The composite structural member according to claim 1, wherein said adhesive bond comprise an enhancing coating on the surface of at least one of said elements, said coating comprising a moisture curing polyurethane prepolymer including free isocyanate groups.

8. A dynamic load transmitting composite structural device comprising dynamic load introducing means including a load distribution metal plate (14) and a load applying member (18) rigidly secured to said load distribution metal plate, a force transmitting element (12), an adhesion bond between said metal plate (14) and said force transmitting element (12) which comprises a pressure cast blank of polyurethane with an open cell structure the skin of which has been removed from at least one surface of said force transmitting element, a slowly curing, moisture cured polyurethane prepolymer applied to said one surface so that the prepolymer penetrates into said open cell structure of the polyurethane blank, said one surface and said metal plate contacting each other, whereby said adhesion bond is formed upon curing the polyurethane prepolymer in a humid atmosphere, said bond being capable of taking-up repeatedly applied dynamic loads, whereby a dynamic load is introduced substantially at a point and transmitted to the force transmitting element substantially over a surface area.

9. The composite structural member according to claim 8, wherein said moisture curing polyurethane prepolymer is adjusted to have a thixotropic consistency.

10. The composite structural member according to claim 9, wherein prior to said contacting, said other element is provided with a bond enhancing coating on one of its surfaces, said coating comprising a moisture curing polyurethane prepolymer including free isocyanate groups, and wherein said elements contact each other prior to curing so that the curing of the coating of the prepolymer with the free isocyanate groups and of the other prepolymer takes place simultaneously.

11. The composite structural member according to claim 10, wherein said curing took place under the influence of heat.

12. The composite structural member according to claim 1, wherein said adhesive bonds are single component materials.

* * * * *

UNITED STATES PATENT OFFICE
CERTIFICATE OF CORRECTION

Patent No. 4,132,825    Dated January 2, 1979

Inventor(s) Hans-Juergen Hahn

It is certified that error appears in the above-identified patent and that said Letters Patent are hereby corrected as shown below:

In Claim 10, line 2, "claim 9" should read --claim 8--.

Signed and Sealed this

Twelfth Day of June 1979

[SEAL]

Attest:

RUTH C. MASON
Attesting Officer

DONALD W. BANNER
Commissioner of Patents and Trademarks